US012594778B2

(12) United States Patent
Kimura et al.

(10) Patent No.: US 12,594,778 B2
(45) Date of Patent: Apr. 7, 2026

(54) APPARATUS

(71) Applicant: FUJIFILM CORPORATION, Tokyo (JP)

(72) Inventors: Hidetoshi Kimura, Kanagawa (JP); Shinichi Maekawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 150 days.

(21) Appl. No.: 18/290,810

(22) PCT Filed: Aug. 5, 2022

(86) PCT No.: PCT/JP2022/030101
§ 371 (c)(1),
(2) Date: Jan. 22, 2024

(87) PCT Pub. No.: WO2023/026822
PCT Pub. Date: Mar. 2, 2023

(65) Prior Publication Data

US 2024/0253374 A1 Aug. 1, 2024

(30) Foreign Application Priority Data

Aug. 25, 2021 (JP) ................................ 2021-137572

(51) Int. Cl.
*B41J 13/10* (2006.01)
*B41J 29/13* (2006.01)

(52) U.S. Cl.
CPC ............. *B41J 29/13* (2013.01); *B41J 13/106* (2013.01)

(58) Field of Classification Search
CPC ... B41J 3/46; B41J 13/106; B41J 29/00; B41J 29/13; B41J 29/15
See application file for complete search history.

(56) References Cited

U.S. PATENT DOCUMENTS 8,493,631 B2 * 7/2013 Takata ............... G03G 15/5087 358/401
8,780,394 B2 * 7/2014 Tsuduki ............ H04N 1/00493 358/1.15

(Continued)

FOREIGN PATENT DOCUMENTS

EP 3159171 A1 4/2017
JP 2000-055017 A 2/2000

(Continued)

OTHER PUBLICATIONS

English language translation of the following: Office action dated May 20, 2025 from the JPO in a Japanese patent application No. 2021-137572 corresponding to the instant patent application. This office action translation is submitted now in order to supplement the understanding of the cited references which are being disclosed in the instant Information Disclosure Statement.

*Primary Examiner* — Anh T Vo
(74) *Attorney, Agent, or Firm* — SOLARIS Intellectual Property Group, PLLC

(57) ABSTRACT

An apparatus includes: a housing having a placement portion on which a discharge target object discharged from a discharge port is placed, and a standing wall rising from an end portion of the placement portion and having the discharge port formed therein, the housing allowing an operator to access the placement portion from at least a side facing toward a direction of the standing wall; a display unit; and a coupling portion that couples the standing wall and the display unit in a state where a space is provided below the display unit, and enables the display unit to face a front direction of the housing and a side direction of the housing.

9 Claims, 9 Drawing Sheets

(56) References Cited

U.S. PATENT DOCUMENTS

| | | | | |
|---|---|---|---|---|
| 2001/0009620 | A1 | 7/2001 | Kabumoto et al. | |
| 2008/0316541 | A1* | 12/2008 | Takata | G06F 1/1601<br>358/401 |
| 2012/0236340 | A1 | 9/2012 | Tsuduki et al. | |
| 2017/0242637 | A1* | 8/2017 | Yamaguchi | G06F 3/1217 |
| 2018/0013904 | A1* | 1/2018 | Hozono | H04N 1/00408 |

FOREIGN PATENT DOCUMENTS

| | | | |
|---|---|---|---|
| JP | 2000-131905 | A | 5/2000 |
| JP | 2000-214649 | A | 8/2000 |
| JP | 2000-275923 | A | 10/2000 |
| JP | 2006-347090 | A | 12/2006 |
| JP | 2010-170003 | A | 8/2010 |
| JP | 2018-001650 | A | 1/2018 |
| JP | 6536168 | B2 | 7/2019 |

* cited by examiner

APPARATUS

TECHNICAL FIELD

The present disclosure relates to an apparatus.

BACKGROUND ART

Japanese Patent No. 6536168 discloses an image forming apparatus including: an image forming unit that forms an image based on image data; an operation display unit that displays information and receives an operation input; and a control unit that manages a print job, controls the image forming unit, and further controls display and operation reception of the operation display unit, in which the control unit has, as a function of confirming in advance an output result of the print job, a print confirmation function involving printing and a display confirmation function that performs only screen display based on setting contents related to printing, and when the setting related to printing is changed, automatically selects one or both of the print function involving printing and the screen confirmation function by screen display as a recommended confirmation function according to the changed contents.

SUMMARY OF INVENTION

Technical Problem

In the configuration in which the display unit faces forward in the state of being disposed on the upper portion of the apparatus, it is not possible to confirm the screen display of the display unit when the operator is positioned at a position other than the front side of the apparatus.

The present disclosure provides an apparatus in which an operator works on a front surface side and a side surface side of a housing, and in which workability of the operator is improved as compared with a case in which a display unit faces only a front direction.

Solution to Problem

An apparatus according to a first aspect includes: a housing having a placement portion on which a discharge target object discharged from a discharge port is placed, and a standing wall rising from an end portion of the placement portion and having the discharge port formed therein, the housing allowing an operator to access the placement portion from at least a side facing toward a direction of the standing wall; a display unit; and a coupling portion that couples the standing wall and the display unit in a state in which a space is provided below the display unit, and enables the display unit to face a front direction of the housing and a side direction of the housing.

An apparatus according to a second aspect is the apparatus according to the first aspect, in which the coupling portion enables the display unit to further face a back direction of the housing.

An apparatus according to a third aspect is the apparatus according to the first aspect or the second aspect, in which the housing further includes another placement portion which is disposed on a back surface side with respect to the placement portion and on which a discharge target object is placed, and which has an overhang portion overhanging from the back surface side to a side opposite to a front direction of the housing.

An apparatus according to a fourth aspect is the apparatus according to the third aspect, in which the other placement portion further includes a protruding portion protruding from the overhang portion to a side opposite to the placement portion with respect to the standing wall.

An apparatus according to a fifth aspect is the apparatus according to the third aspect or the fourth aspect, in which the housing includes a projecting portion projecting toward a back surface side from a projecting starting point of the overhang portion on a side opposite to the placement portion with respect to the standing wall, and when viewed from the side direction of the housing, an end on a back surface side of the overhang portion overlaps with an end on a back surface side of the projecting portion.

An apparatus according to a sixth aspect is the apparatus according to any one of the third to fifth aspects, in which when viewed from the front direction of the housing, an end of the other placement portion in the side direction of the housing overlaps with an end of the placement portion in the side direction of the housing.

An apparatus according to a seventh aspect is the apparatus according to any one of the first to sixth aspects, in which a connecting portion between the standing wall and the coupling portion is located on a front side of the placement portion.

An apparatus according to an eighth aspect is the apparatus according to any one of the first to seventh aspects, in which the display unit is entirely located above the placement portion in a state of facing a back direction of the housing.

An apparatus according to a ninth aspect is the apparatus according to any one of the first to eighth aspects, in which a forming unit that forms an image on a recording medium is provided in a portion opposite to the placement portion with respect to the standing wall in the housing, and a medium on which an image is formed by the apparatus is discharged as the discharge target object onto the placement portion.

Advantageous Effects of Invention

According to the apparatus of the first aspect, in the apparatus in which the operator works on the front surface side and the side surface side of the housing, the workability of the operator is improved as compared with the case in which the display unit faces only the front direction.

According to the apparatus of the second aspect, the workability of the operator is improved when the operator performs the work on the back surface side of the housing as compared with the case in which the display unit faces only the front direction and the side direction.

According to the apparatus of the third aspect, the discharge target object can be placed side by side on the placement portion and the other placement portion.

According to the apparatus of the fourth aspect, an object other than the discharge target object can be placed on the protrusion of the other placement portion.

According to the apparatus of the fifth aspect, it is possible to suppress the size of the apparatus in the depth direction as compared with the case in which the overhang portion projects beyond the projecting portion of the housing.

According to the apparatus of the sixth aspect, an increase in the size of the apparatus in the width direction can be suppressed as compared with a case in which the side end of the other placement portion is located on the side of the housing beyond the range of the placement portion.

According to the apparatus of the seventh aspect, it is possible to improve the handleability of the discharge target object on the placement portion by the operator as compared with the case in which the connecting portion between the standing wall and the coupling portion is positioned on the upper side of the placement portion in the side view.

According to the apparatus of the eighth aspect, it is possible to improve the visibility of the display unit when the operator performs work on the back side of the apparatus as compared with the case in which the display unit facing the back direction is located on the front side of the placement portion.

According to the apparatus of the ninth aspect, in the apparatus in which the operator handles the medium on which the image is formed on the placement portion from the side surface side, the workability of the operator is improved as compared with the case in which the display unit faces only the front direction.

DESCRIPTION OF EMBODIMENTS

Figure 1:
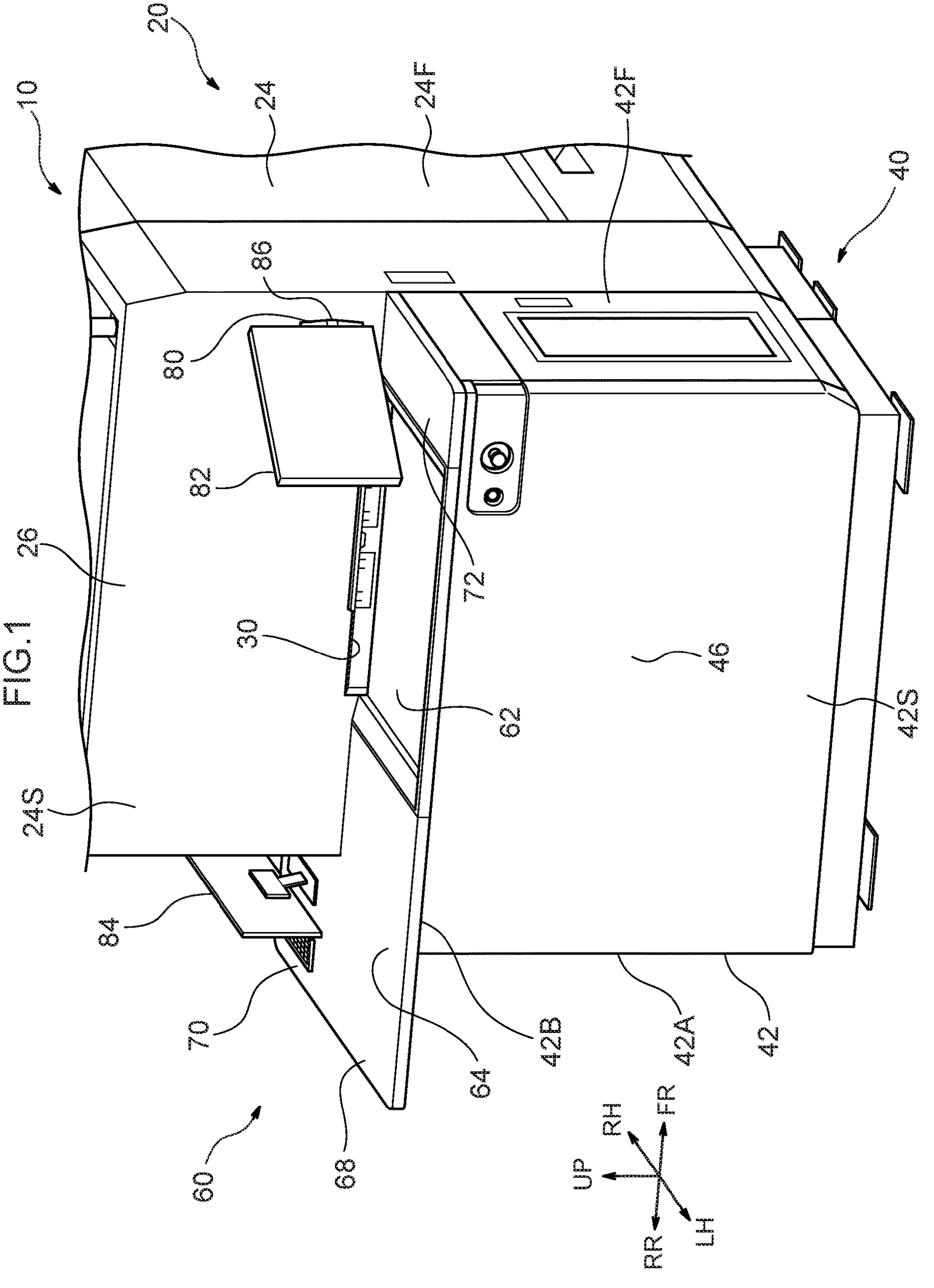
FIG. 1 is a perspective view illustrating a part of an apparatus according to an embodiment of the present disclosure.
Figure 2A:
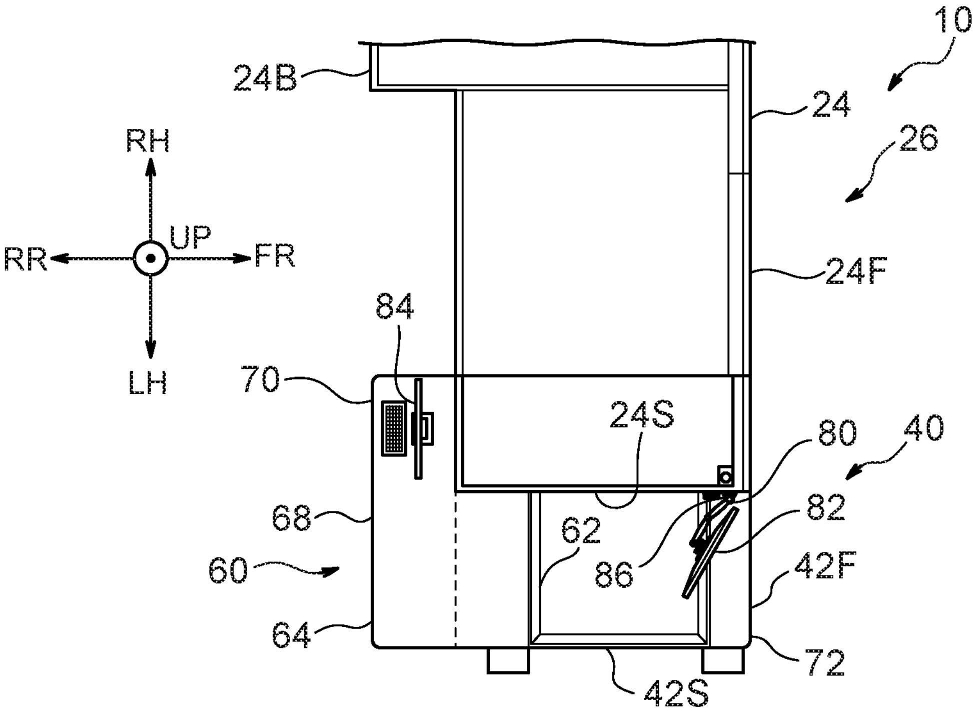
FIG. 2A is a plan view illustrating a part of an apparatus according to an embodiment of the disclosure.
Figure 2B:
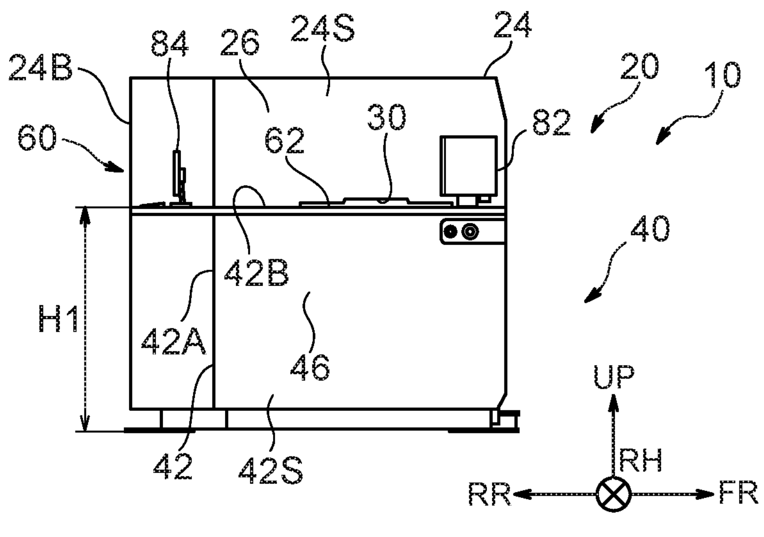
FIG. 2B is a side view illustrating a part of the apparatus according to the embodiment of the disclosure.
Figure 2C:
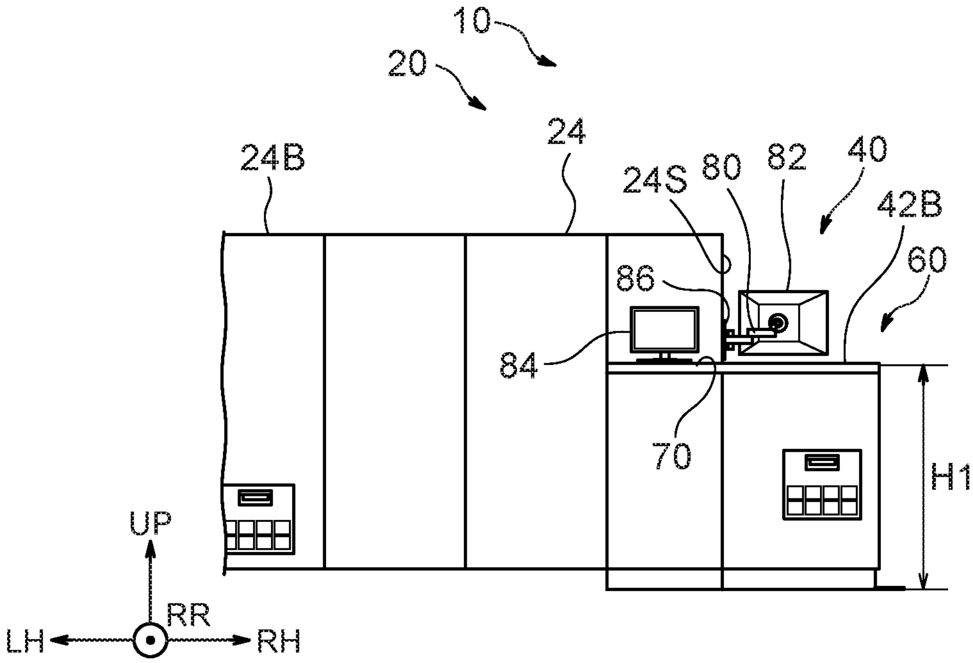
FIG. 2C is a rear view illustrating a part of the apparatus according to the embodiment of the disclosure.

Hereinafter, an example of an embodiment of the present disclosure will be described with reference to the drawings. In each drawing, the same or equivalent components and components are denoted by the same reference numerals. In addition, dimensional ratios in the drawings are exaggerated for convenience of description, and may be different from actual ratios.

In addition, an arrow UP illustrated in each drawing indicates the up-down direction and the apparatus upward direction, an arrow LH indicates the horizontal direction and the apparatus width direction leftward direction, an arrow RH indicates the horizontal direction and the apparatus width direction rightward direction, an arrow FR indicates the horizontal direction and the apparatus frontward direction, and an arrow RR indicates the horizontal direction and the apparatus rearward direction (depth direction).

In the following description, "up-down direction" may be used to mean "both the upward direction and the downward direction" or "one of the upward direction and the downward direction". The "left-right direction" may be used to mean "both the rightward direction and the leftward direction" or "one of the rightward direction and the leftward direction". The "left-right direction" can also be referred to as a lateral direction or a horizontal direction. The "front-rear direction" may mean "both the frontward direction and the rearward direction" or "one of the frontward direction and the rearward direction". The "front-rear direction" can also be referred to as a lateral direction or a horizontal direction. The up-down direction, the left-right direction, and the front-rear direction are directions (specifically, orthogonal directions) crossing each other.

The apparatus 10 according to the description of the disclosure is, for example, an inkjet type image forming apparatus that forms an image by attaching ink to a sheet-like recording medium P.

In the present description, a surface of the apparatus 10 facing the frontward direction is referred to as a "front surface" in the disclosure, and a surface of the apparatus 10 facing the rearward direction is referred to as a "back surface" in the disclosure.

(Overall Configuration)

As illustrated in FIG. 1 and FIGS. 2A to 2C, the apparatus 10 according to the disclosure includes, as an example, a first body 20 that forms an image on a recording medium P, and a second body 40 disposed on a left side of the first body 20. Furthermore, the apparatus 10 includes a display operation unit 82.

(First Body 20)

As illustrated in FIGS. 1 and 2A to 2C, the first body 20 includes a first housing 24 that accommodates various apparatuses including an image forming unit that forms an image on a sheet-like recording medium P. The first housing 24 includes a housing body 24A formed in a rectangular parallelepiped shape and a projecting portion 24B having a rectangular parallelepiped shape projecting rearward from a right side portion of the housing body 24A, and has an L shape in plan view.

On the front surface of the first housing 24, that is, the first body 20, a cover that opens and closes at the time of internal maintenance, a pull-out tray that stores a recording medium, a cover that opens and closes at the time of removing a paper jam of paper, and the like are disposed. That is, the front surface of the first body 20 is a surface on which an operator has the highest access frequency in the apparatus 10.

A discharge port 30 is formed in the left side surface 24S of the first housing 24. The discharge port 30 is a portion where the recording medium P on which an image is formed in the first body 20 is discharged from the first housing 24. The discharge port 30 is formed in a slit shape long in the front-rear direction at an intermediate portion in the up-down direction on the left side surface 24S, and discharges the recording medium P in an attitude in which the thickness direction thereof is the up-down direction. The discharge port 30 is an example of a discharge portion. Furthermore, the recording medium P on which an image is formed is an example of an object to be discharged.

Of the walls forming the left side surface 24S of the first housing 24, a wall forming a portion above the lower edge (in other words, the upper surface of the second housing 42) of the discharge port 30 is referred to as a standing wall 26.

Since the end portion of the table portion 42B of the second body 40 described later abuts on the standing wall 26, it can be understood that the standing wall 26 rises from the table portion 42B.

The housing body 24A of the first housing 24 accommodates an image forming unit that forms an image on the sheet-like recording medium P, a sheet feeding unit that supplies the recording medium to the image forming unit, a conveyance unit, and the like. A power supply board, a control board, and the like are accommodated in the projecting portion 24B.

In the first body 20 described above, each unit is controlled by the control unit mounted on the control board, an image is formed on the recording medium P, and the recording medium P on which the image is formed is discharged from the discharge port 30.

In addition, the image forming unit, the sheet feeding unit, the conveyance unit, and the like housed in the housing body 24A can also be regarded as being disposed on the opposite side of the second body 40 described later with respect to the standing wall 26.

(Second Body 40)

As shown in FIG. 1 and FIGS. 2A to 2C, the second body 40 is disposed adjacent to the left side of the first body 20. The second body 40 includes a second housing 42. The second housing 42 includes a rectangular parallelepiped housing body 42A having a height lower than that of the first housing 24, and a table portion 42B forming a part of a working portion 60 described later.

A carriage is built in the housing body 42A, and the recording medium P on which an image is formed is discharged. The height of the second housing 42 is equal to the height to the portion where the discharge port 30 is formed in the first housing. In addition, the front-rear length (that is, the depth dimension) of the housing body 42A in the second housing 42 is equivalent to the depth dimension of the left side surface 24S of the first housing 24, and the lateral width of the second housing is slightly larger than the dimension along the discharge direction of the recording medium P having the maximum size capable of forming an image in the first body 20.

The height H1 of the upper surface of the second body 40 is, for example, 1000 mm from the installation surface of the apparatus 10, and the second housing 42, that is, the upper portion of the second body 40 is the working portion 60. That is, the second body 40 has an upper surface connected to the left side surface 42S and the front surface 42F, and the upper surface serves as the working portion 60.

In the present description, a combination of the second housing 42 of the second body 40 and the first housing 24 of the first body 20 is an example of the housing.

(Working Portion 60)

The working portion 60 includes, on the upper surface of the second housing 42, a top tray 62 formed below the discharge port 30 of the first body 20 in the left side view, a side table 64 adjacent to the rear of the top tray 62, and a front table 72 adjacent to the front of the top tray 62. The top tray 62 is an example of a placement portion, and the side table 64 is an example of another placement portion.

The top tray 62 is a portion on which the recording medium P discharged from the discharge port 30 is placed, and in the present embodiment, a predetermined number of recording media P are stacked. That is, the placement surface, which is the upper surface of the top tray 62, is disposed below the nip portion of the discharge roll pair (not illustrated) exposed from the discharge port 30.

A placement surface of the top tray 62 has a rectangular shape in plan view, and a recording medium P having a maximum size on which an image can be formed by the first body 20 is placed without protruding in plan view.

The side table 64 has a rectangular shape in plan view, and is formed in a rectangular shape in plan view by a rear side portion of the top tray on the upper surface of the housing body 42A and an overhang portion 68 overhanging rearward from the housing body 42A. The side table 64 is configured such that the recording medium P having the maximum size on which an image can be formed by the first body 20 is placed without protruding in plan view.

The side table 64 has a rectangular protruding portion 70 protruding rightward from the right edge of the overhang portion 68. The front edge of the protruding portion 70 is in contact with the back surface of the left side portion of the first housing 24 or faces the back surface with a slight gap interposed therebetween.

The side table 64, that is, the rear edges of the overhang portion 68 and the protruding portion 70 overlap with the rear edge of the projecting portion 24B in the left side view. That is, the overhang portion 68 and the protruding portion 70 do not protrude rearward from the rear edge of the first housing 24.

Here, the overhang portion 68 projects rearward from the rear end of the housing body 42A, and the projecting portion 24B is a portion projecting rearward from the other portion of the housing body 24A and the rear end of the housing body 42A. Therefore, the projecting portion 24B can also be regarded as a portion projecting rearward from the projecting starting point of the overhang portion 68 in the first housing 24.

When the second housing 42 is viewed from the front, left ends of the second housing 42 and the side table 64 overlap each other. That is, the side table 64 is configured not to protrude leftward from the left edge of the second body 40.

The protruding portion 70 is configured to be able to place a medium other than the recording medium P. In the present embodiment, as an example of a medium other than the recording medium P, an external apparatus 84 having a function of displaying and editing image data such as a personal computer is connected to the control unit and placed on the protruding portion 70.

A portion of the side table 64 excluding the protruding portion 70 can also be regarded as an example of another placement portion.

The front table 72 is configured as a rectangular portion on the front side of the top tray 62 on the upper surface of the housing body 42A. Input apparatuses such as a mouse and a keyboard to be input to a display operation unit 82 described later can be placed on the front table 72.

The working portion 60 described above is used for various works of the operator M. Specifically, as described later, the top tray 62 and the side table 64 are mainly used for work from the left side surface by the operator M accessed by the operator M from the left side. Examples of the work include confirmation and comparison of the recording medium P discharged from the discharge port 30.

The protruding portion 70 of the side table 64 is mainly used for work from the back surface. Examples of the work include apparatus setting using the external apparatus 84.

The front table 72 is mainly used for work from the front.

In the side table 64, it is desirable that the overhang portion 68 and the protruding portion 70 each have a space with respect to the installation surface of the apparatus 10.

(Display Operation Unit 82 and Coupling Portion 80)

Next, the display operation unit 82, which is an example of a display unit included in the apparatus 10 of the disclosure, will be described with appropriate reference to FIGS. 3 to 5.

Figure 3:
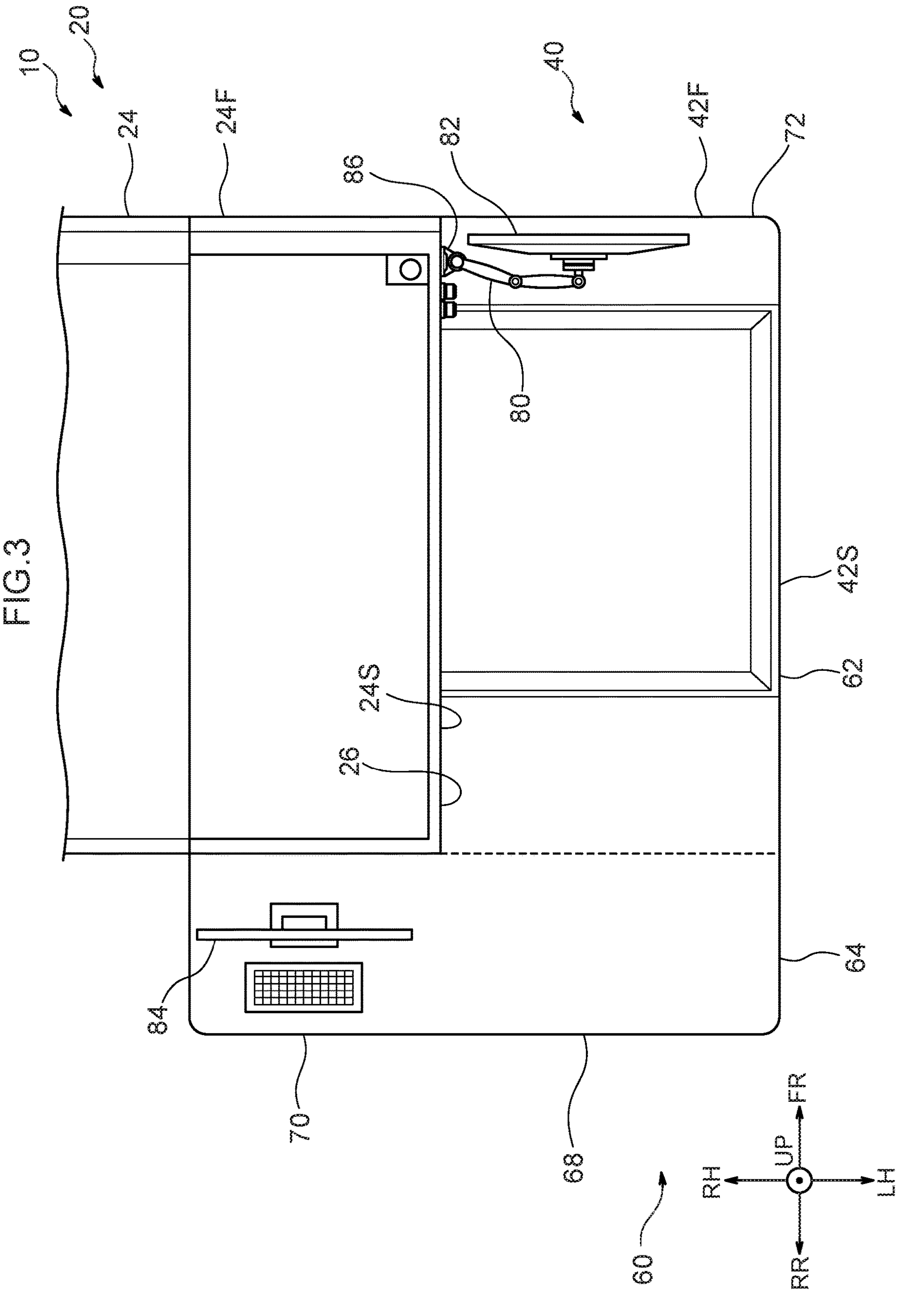
FIG. 3 is a plan view illustrating a part of the apparatus in a state where the display unit according to the embodiment of the disclosure faces the front.

As an example, the display operation unit 82 is a touch panel type user interface having a substantially rectangular shape, and is disposed above the front portion of the second body 40 as illustrated in FIG. 3. That is, the display operation unit 82 is disposed so as to overlap the front portion of the second housing 42 in plan view.

The display operation unit 82 has a function of displaying information on the apparatus 10 to the operator M. The display operation unit 82 has a function of receiving an input operation from the operator M. For example, the display operation unit 82 is operated by the operator M when the operator M causes the apparatus 10 to execute processing of forming an image, thereby transmitting a signal for executing processing of forming an image on the recording medium P to the control unit.

Note that the signal to be transmitted includes, for example, in addition to image data of an image to be formed on the recording medium P, various setting values to be referred to when image forming processing is performed, such as a type of sheet to be used as the recording medium P, a conveyance speed of the recording medium P, and a color to be formed on the recording medium P.

In addition, the display operation unit 82 has a function of displaying various setting values to be referred to when the above-described image forming processing is performed, in addition to the image to be formed on the recording medium P.

That is, when performing an operation of forming an image on the recording medium P, the operator M can confirm trouble information such as the above-described various setting values and paper jam displayed on the display operation unit 82.

As shown in FIG. 1 and FIGS. 2A to 2C, the display operation unit 82 is coupled to the standing wall 26 by the coupling portion 80 with a space therebelow. More specifically, one end of the coupling portion 80 is connected to the connecting portion 86 provided on the standing wall 26 of the first housing 24, and the other end is connected to the display operation unit 82 positioned above the second body 40. The connecting portion 86 may be connected to a frame member (not illustrated) covered with the standing wall 26.

As an example, the coupling portion 80 is an articulated horizontal arm including a plurality of shafts extending in the up-down direction and a plurality of arms that are hollow members and connected to the respective shafts. The coupling portion 80 is configured to direct the display operation unit 82 in the forward direction, the leftward direction, and the rearward direction as the arm rotates about each axis.

When the standing wall 26 is viewed from the side, the coupling portion 80 is connected to the connecting portion 86 provided on the front surface 24F side of the first body 20 with respect to the center of the left side surface 24S. That is, the coupling portion 80 supports the display operation unit 82 at a position where the operator M standing in front of the second body 40 can easily operate the display operation unit.

The coupling portion 80 can switch the attitude of the display operation unit 82 to an attitude facing forward on the left side of the standing wall 26, an attitude facing leftward above the front portion (here, the right side as viewed from the operator M standing on the side surface side) of the working portion 60, and an attitude facing rearward on the left side (here, the right side as viewed from the operator M standing on the back surface side) of the standing wall 26. In the present description, regarding the display operation unit 82, the attitude in which the screen is directed forward is an example of the attitude "facing the front direction", the attitude in which the screen is directed leftward is an example of the attitude "facing the side direction", and the attitude in which the screen is directed rearward is an example of the attitude "facing the back direction". That is, the "front direction" in the present description is a front side orthogonal to the front surface 42F, the "side direction" is a left side orthogonal to the left side surface 42S, and the "back direction" is a rear side orthogonal to the rear surface of the second housing 42.

More specifically, first, as illustrated in FIG. 3, the operator M rotates the coupling portion 80 such that the display operation unit 82 faces the front of the second body 40 via the display operation unit 82.

In this state, the operator M can visually recognize the information on the apparatus 10 displayed on the display operation unit 82 from the front side of the second body 40 and can perform input operation on the display operation unit 82.

Figure 4:
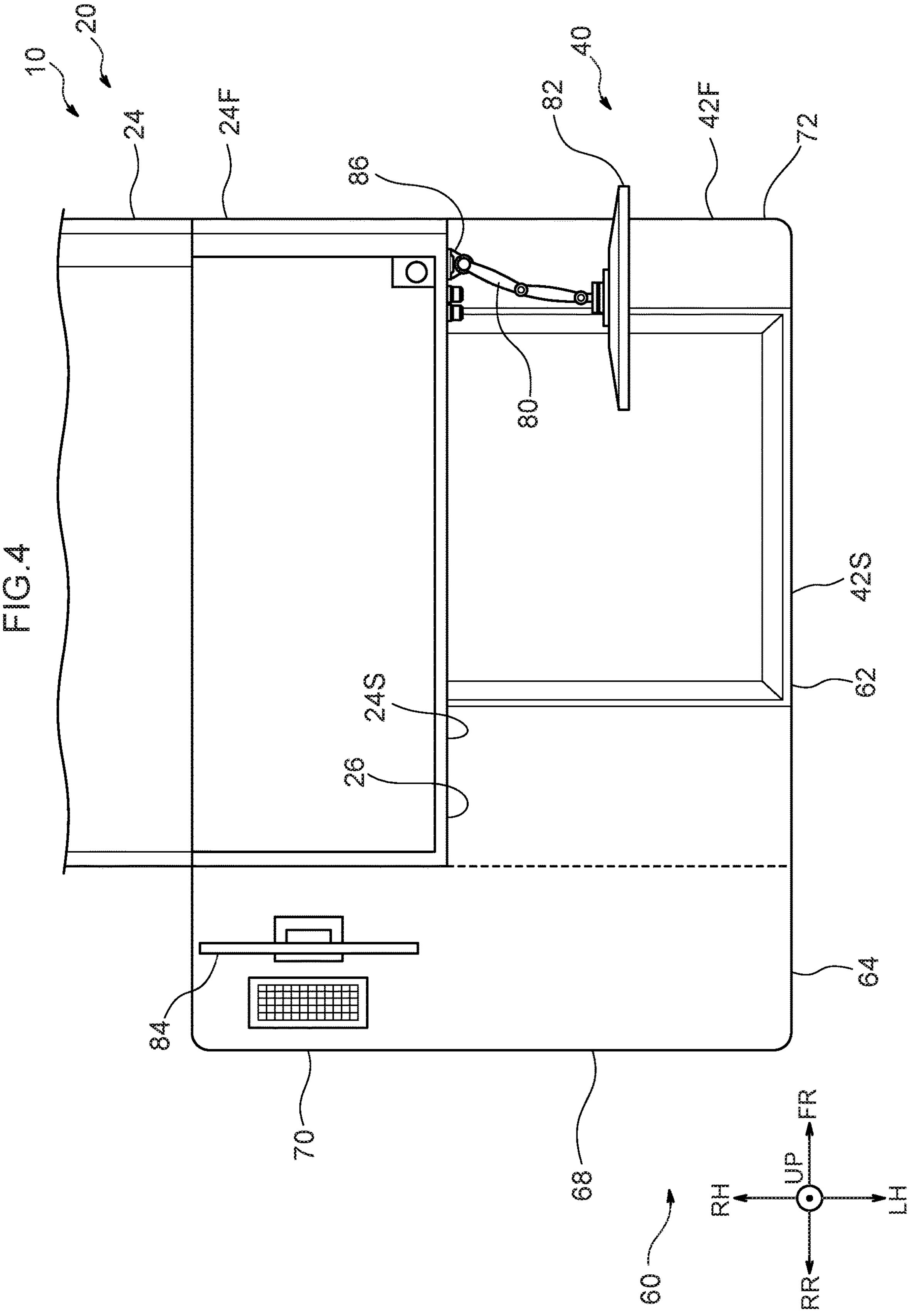
FIG. 4 is a plan view illustrating a part of the apparatus in a state where the display unit according to the embodiment of the disclosure faces a side surface.

Subsequently, as illustrated in FIG. 4, the operator M rotates the coupling portion 80 via the display operation unit 82 such that the display operation unit 82 faces the left side of the second body 40.

In this state, by moving to the left side of the second body 40, the operator M can visually recognize the information on the apparatus 10 displayed on the display operation unit 82 from the left side of the second body 40 and perform the input operation on the display operation unit 82.

Figure 5:
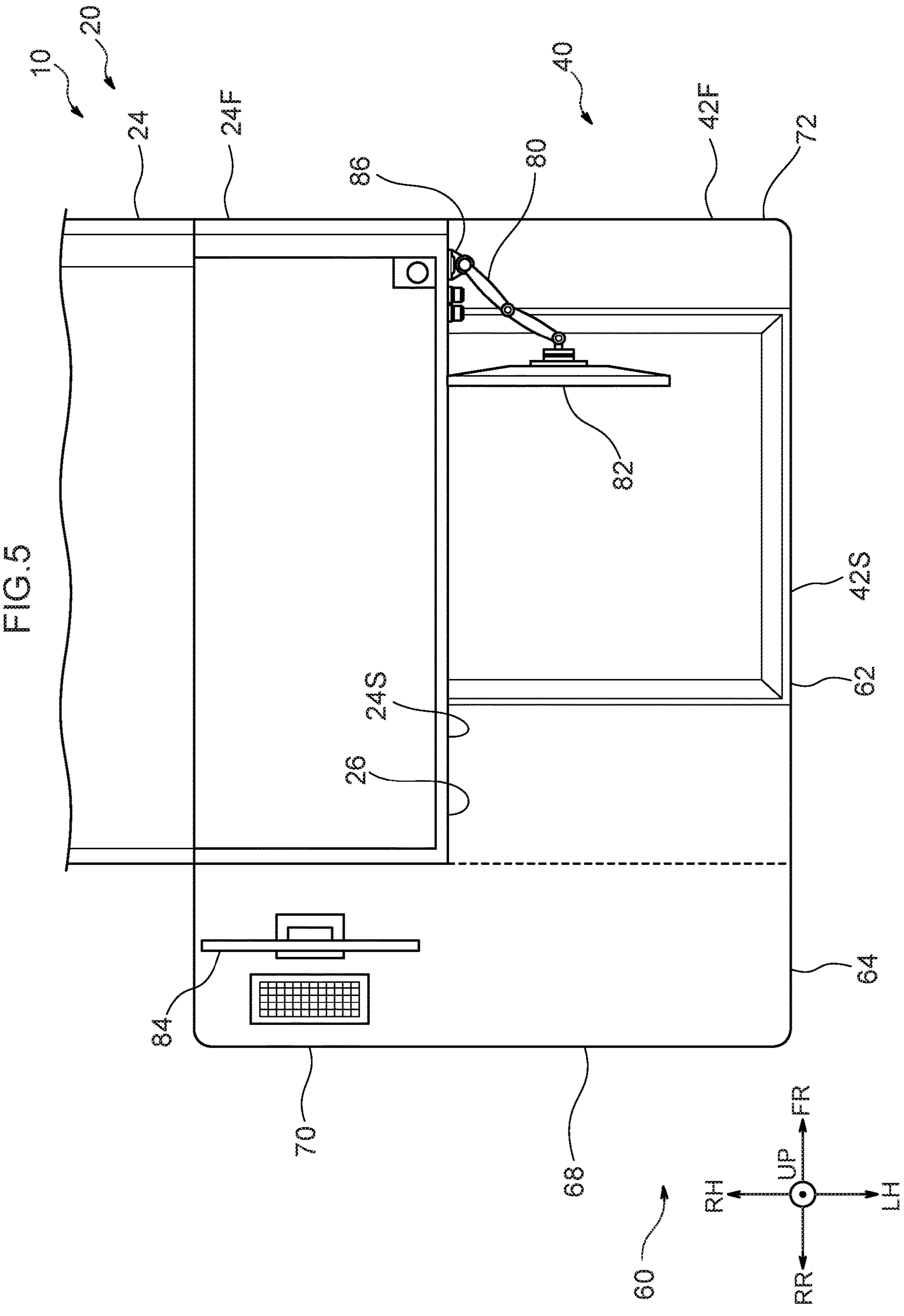
FIG. 5 is a plan view illustrating a part of the apparatus in a state where the display unit according to the embodiment of the disclosure faces a back surface.

Then, as illustrated in FIG. 5, the operator M rotates the coupling portion 80 via the display operation unit 82 such that the display operation unit 82 faces the rear side of the second body 40.

In this state, the operator M can visually recognize the information on the apparatus 10 displayed on the display operation unit 82 from the rear side of the second body 40 by moving to the rear side of the second body 40.

Note that the display operation unit 82 may be connected to and communicate with the first body 20 in any way, but is connected to the first body 20 by using a cable as an example, and the cable is stored and supported inside the arm.

(Movement of Operator M)

Next, a state in which the operator M performs work using the apparatus 10 according to the disclosure will be described with appropriate reference to FIGS. 6 to 8.

Figure 6:
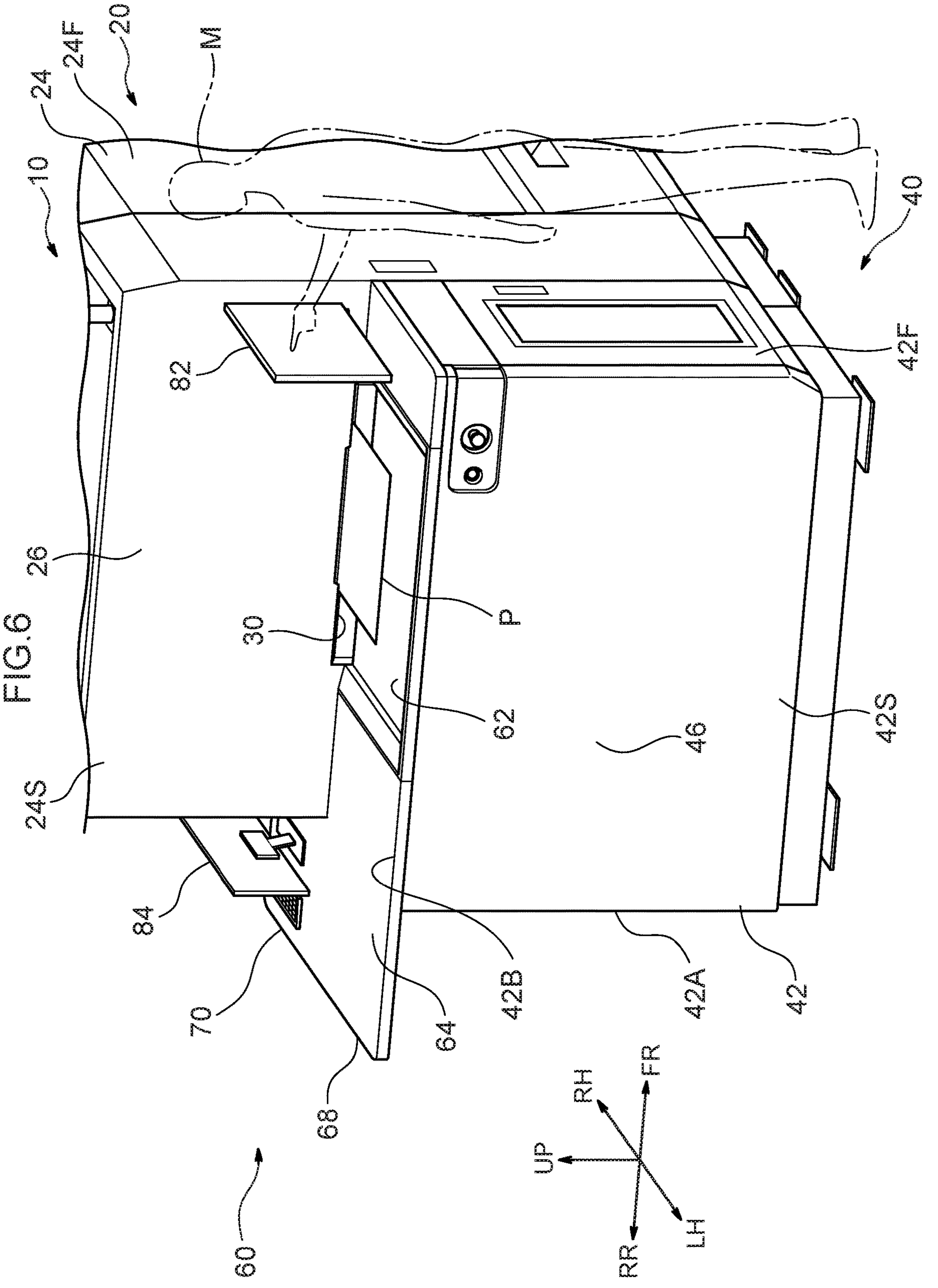
FIG. 6 is a perspective view illustrating a state of performing work from the front using the apparatus according to the embodiment of the disclosure.

FIG. 6 is a view illustrating a state in which the operator M performs work in front of the second body 40. As illustrated in FIG. 6, the operator M operates the display operation unit 82 from the front of the apparatus 10 with the display operation unit 82 facing the front of the second body 40.

By this operation, the operator M inputs setting values of the image forming processing performed by the first body 20, such as image data to be formed on the recording medium P and a sheet to be used, and forms an image on the recording medium P.

In addition, the operator M checks the screen of the display operation unit 82 while performing maintenance work of the first body 20 such as sheet supply and paper jam removal in front of the front surface 24F of the first body 20.

In this manner, the operator M forms an image while checking the screen of the display operation unit 82 while being positioned in front of the first body 20 or in front of the second body 40.

Figure 7:
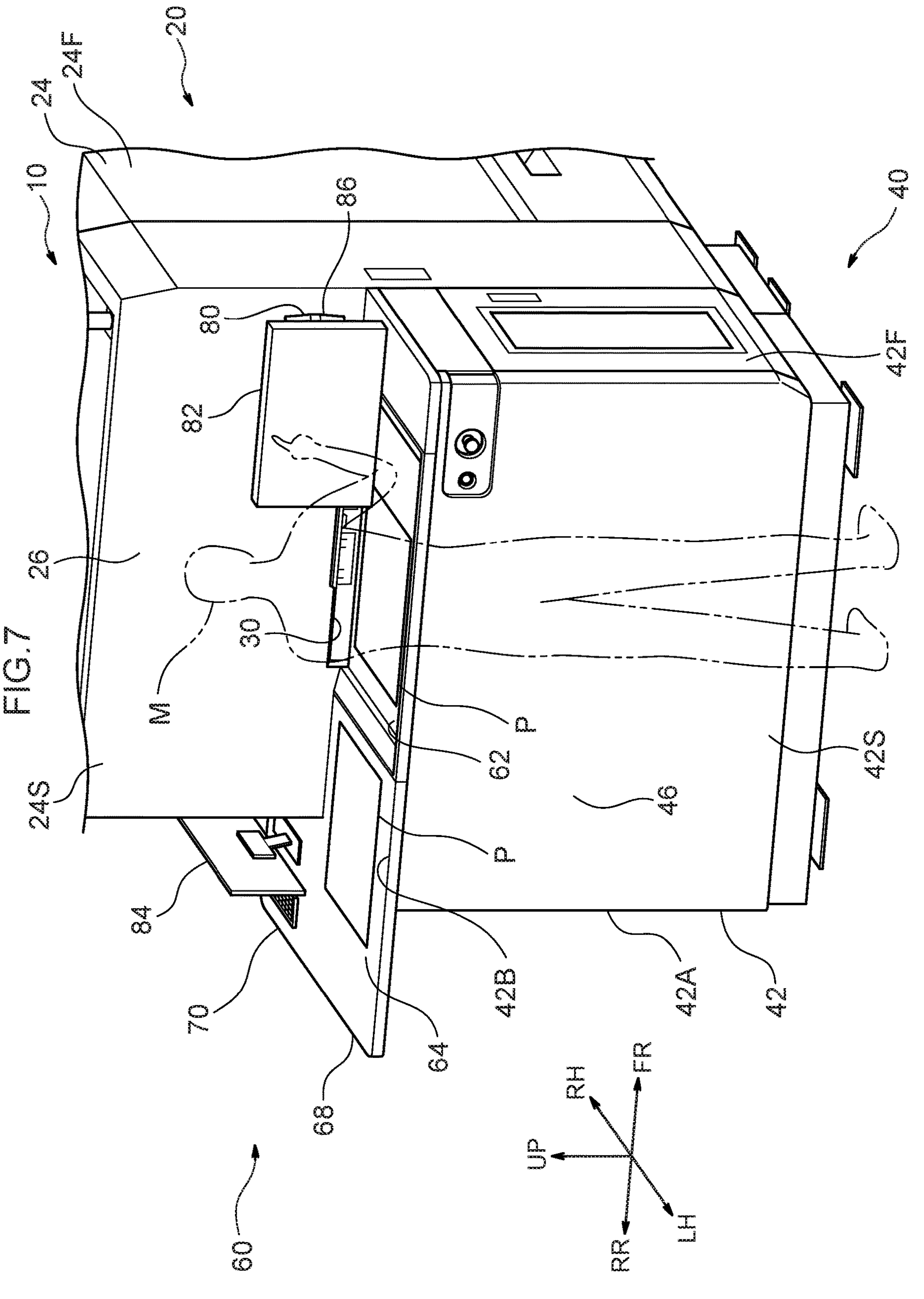
FIG. 7 is a perspective view illustrating work performed from a side surface using the apparatus according to the embodiment of the disclosure.

FIG. 7 is a view illustrating a state in which the operator M performs work on the left side of the second body 40. As illustrated in FIG. 7, the operator M moves to the left of the second body 40 and checks the recording medium P discharged to the top tray 62 in a state where the display operation unit 82 faces the left of the second body 40.

The operator M places the recording medium P discharged onto the top tray 62 side by side on the side table 64, and compares the recording medium P placed on the side table 64 and the recording medium P discharged onto the top tray 62 side by side.

Then, the operator M checks the finish of the image formed on each recording medium P on the left side of the second body 40, and corrects various setting values by performing input operation on the display operation unit 82 according to the finish.

In this manner, the operator M adjusts the image to be formed on the recording medium P by performing input operation on the display operation unit 82 while confirming the finish of the image to be formed on the recording medium P in a state of being positioned on the left side of the second body 40.

Figure 8:
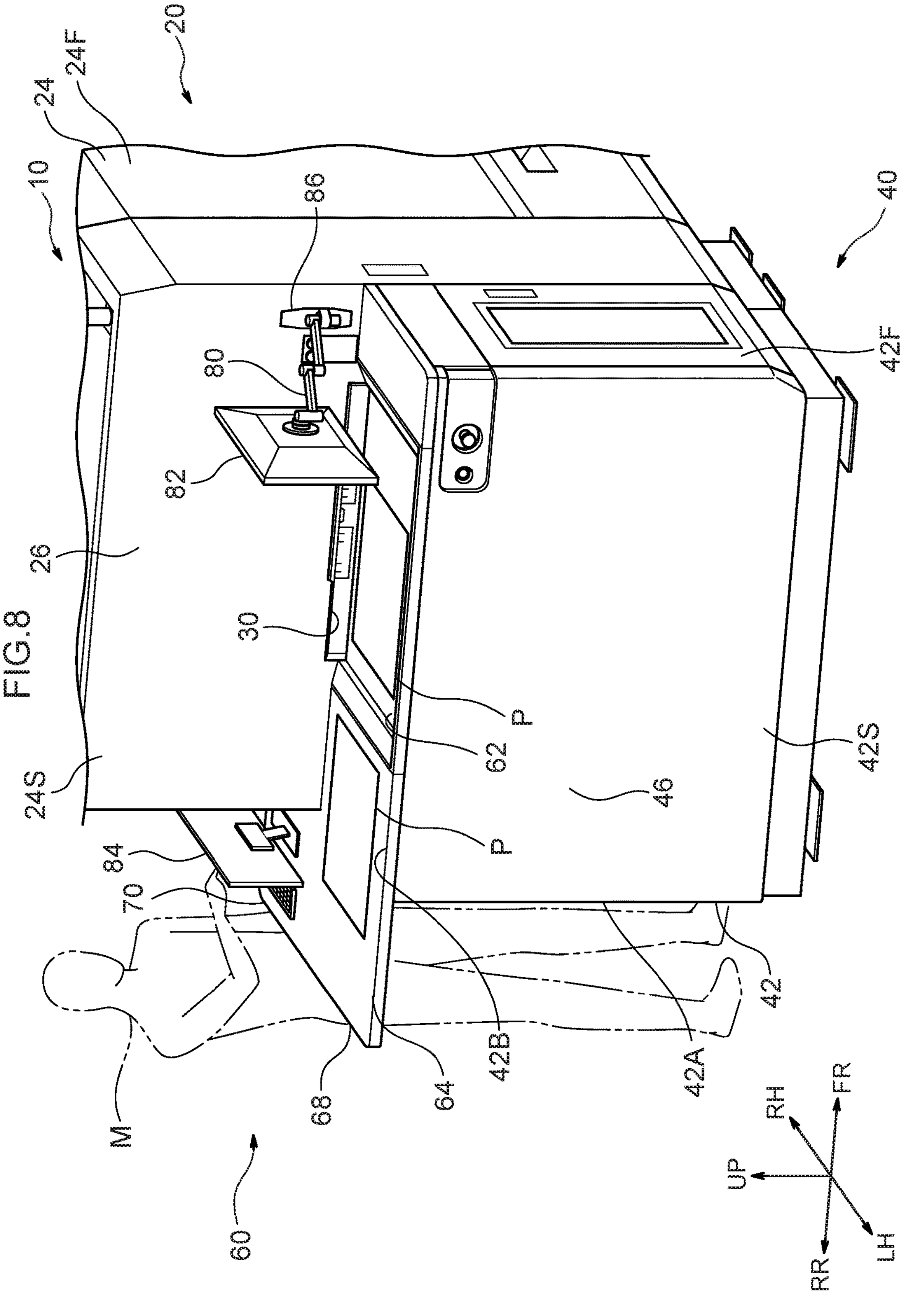
FIG. 8 is a perspective view illustrating work performed from the back side using the apparatus according to the embodiment of the disclosure.

FIG. 8 is a view illustrating a state in which the operator M performs work behind the second body 40. The operator M moves to the rear side of the second body 40 with the display operation unit 82 facing the rear side of the second body 40, and displays the image data stored in the external apparatus 84 placed on the protruding portion 70.

Further, the operator M checks the image formed on the recording medium P, and in a case in which the intended image is not formed, the operator M operates the external apparatus 84 to edit the image data of the image formed on the recording medium P.

Then, the operator M transmits the image data edited using the external apparatus 84 to the control unit, and corrects the image data of various setting values in the image forming processing.

In this manner, the operator M adjusts the image to be formed on the recording medium P by editing the image data using the external apparatus 84 while confirming the finish of the image to be formed on the recording medium P and various setting values displayed on the display operation unit 82 in the state of being positioned behind the second body 40.

Thereafter, the operator M moves forward or leftward of the second body 40, rotates the display operation unit 82 in the direction in which the operator M is located, and operates the display operation unit 82 to form an image on the recording medium P again.

As described above, the operator M moves forward, leftward, and rearward of the second body 40 to perform different operations in a series of operations, and corrects various setting values in the image forming process while checking the finish of the image formed on the recording medium P and the various setting values displayed on the display operation unit 82.

The operator M may edit the image data not by operating the external apparatus 84 placed on the protruding portion 70 as described above, but by operating the external apparatus 84 arranged at a place other than the protruding portion 70 in the apparatus 10. Further, the operator M may edit the image data by operating the external apparatus 84 disposed at a position away from the apparatus 10, and transmit the image data to the control unit through the network.

(Action and Effect)

In the apparatus according to the disclosure, the following effects can be obtained.

In the apparatus 10 according to the disclosure, the second housing 42 can access the top tray 62 from the left, and the display operation unit 82 can face forward, leftward, and rearward of the second body 40 by the coupling portion 80.

Thus, in the apparatus 10 in which the operator M works in front of and on the left of the second body 40, the workability of the operator M is improved as compared with the case in which the display operation unit 82 faces only in front of the apparatus 10.

Further, since the display operation unit 82 can face the rear side of the second body 40, it is possible to confirm various setting values displayed on the display operation unit 82 even when the operator M performs work behind the second body 40.

As a result, when the operator M performs work behind the second body 40, workability can be improved as compared with a case in which the display of the display operation unit 82 cannot be confirmed.

The table portion 42B of the second body 40 includes a side table 64 behind the top tray 62.

As a result, the recording medium P can be placed on each of the top tray 62 and the side table 64, that is, the two recording media P on which images are formed can be arranged side by side.

In addition, the side table 64 has a protruding portion 70 protruding rightward from the overhang portion 68.

As a result, an apparatus other than the recording medium P, such as the external apparatus 84, can be disposed behind the second body 40.

The overhang portion 68 of the side table 64 is formed such that a rear end thereof overlaps with a rear end of the projecting portion 24B of the first body 20.

As a result, the increase in the size of the apparatus 10 in the depth direction can be suppressed as compared with the case in which the overhang portion 68 of the side table 64 projects rearward of the second body 40.

In addition, since the end of the side table 64 in the leftward direction of the apparatus 10 is formed to overlap the end of the top tray 62 in the leftward direction, the size of the apparatus 10 in the width direction does not increase as compared with the case in which the side table 64 is not provided.

As a result, an increase in the size of the apparatus 10 in the width direction can be suppressed as compared with a case in which the end of the side table 64 is located on the left side of the top tray 62.

In addition, the connecting portion 86 between the standing wall 26 and the coupling portion 80 is positioned in the frontward direction of the top tray 62.

As a result, the handleability of the recording medium P on the top tray 62 by the operator M can be improved as compared with a case in which the connecting portion 86 is positioned above the top tray 62 in a side view.

In addition, the entire display operation unit 82 is positioned above the top tray 62 in a state of facing the rear side of the second body 40.

As a result, it is possible to improve the visibility of the display operation unit 82 when the operator M performs work behind the second body 40 as compared with the case in which the entire display operation unit 82 is located in front of the top tray 62 in the state of facing the rear of the second body 40.

Modified Example

In the above description, the display operation unit 82 can face forward, sideways, and backward, but the present invention is not limited thereto, and it is sufficient that the display operation unit 82 can face forward and sideways. In this configuration, in the apparatus in which the operator M works on the front side and the side surface side of the apparatus 10, the workability of the operator M is improved as compared with the case in which the display operation unit 82 faces only the front side.

In the above description, the side table 64 has the overhang portion 68, but the side table 64 may not have the overhang portion 68 and may be formed such that the rear edge of the side table overlaps the rear end of the second housing 42 in side view. That is, the placement surface of the side table 64 may be smaller than the recording medium P having the maximum size discharged from the apparatus 10.

In the above description, the side table 64 has the protruding portion 70, but the protruding portion 70 may not have the overhang portion 68 in the configuration having the protrusion. In this case, the right end of the side table 64 may be formed so as to overlap the standing wall 26 in front view.

In the above description, the rear end of the overhang portion 68 of the side table 64 is formed so as to overlap with the rear end of the projecting portion 24B of the first housing 24 in a side view. However, the present invention is not limited to this. The rear end may be formed by being retracted forward from the rear edge of the projecting portion 24B of the first housing 24, or may be formed by being projected rearward from the rear end of the projecting portion 24B of the first housing 24.

In the above description, the left end of the side table 64 is formed so as to overlap the left end of the top tray 62 in front view. However, the present invention is not limited thereto, and the left end of the side table may be formed to be retracted rightward from the left end of the top tray 62, or may be formed to protrude leftward from the left end of the top tray 62.

Furthermore, in the above description, the connecting portion 86 is provided in front of the top tray 62 in the standing wall 26, but the present invention is not limited thereto, and may be provided above the top tray 62 in the standing wall 26.

In the above description, the entire display operation unit 82 is positioned above the top tray 62 when the display operation unit 82 faces rearward, but the present invention is not limited thereto, and the display operation unit 82 may be positioned in front of the top tray 62, for example, on the front table 72.

Furthermore, in the above description, the apparatus 10 is an image forming apparatus that forms an image by an inkjet method, but the apparatus 10 according to the disclosure is not limited thereto, and can be used for an electrophotographic image forming apparatus or a printing machine.

Furthermore, in the above description, the apparatus 10 including the image forming apparatus has been described, but the apparatus 10 according to the disclosure is not limited thereto. The discharge target object targeted by the apparatus 10 according to the disclosure can be variously applied to foods, machine parts, and the like in addition to the recording medium P.

For example, if the apparatus 10 is a 3D printer, a three-dimensional object is considered as an example of the discharge target object, if the apparatus 10 is a folding apparatus, folded paper is considered as an example of the discharge target object, and if the apparatus 10 is a bookbinding apparatus, a booklet is considered as an example of the discharge target object.

Furthermore, in the above description, the external apparatus 84 is disposed on the protruding portion 70, but the present invention is not limited thereto, and a tool used for confirming the finished state of the recording medium P, such as a ruler or a writing instrument, may be disposed.

In the above description, the apparatus 10 includes the first body 20 and the second body 40 as separate bodies. However, the present invention is not limited thereto, and configurations corresponding to the first body 20 and the second body 40 may be integrally provided.

Note that it is sufficient for the display operation unit 82 to be able to display the information regarding the apparatus 10 described above. That is, the data input of the display operation unit 82 may be input by an input apparatus such as a keyboard or a mouse disposed on the front table 72, for example.

In the above description, the display operation unit 82 faces the frontward direction, the leftward direction, and the rearward direction. However, in order to make the display operation unit 82 easily viewable according to the height of the operator M, the angle at which the display operation unit 82 faces may be changed by further rotating the display operation unit about the horizontal direction.

Although the embodiments of the disclosure have been described above with reference to the accompanying drawings, it is obvious that a person having ordinary knowledge in the technical field to which the disclosure belongs can conceive various modifications or applications within the scope of the technical idea described in the claims, and it is naturally understood that these also belong to the technical scope of the disclosure.

The disclosure of Japanese Patent Application No. 2021-137572 filed on Aug. 25, 2021 is incorporated herein by reference in its entirety.

All documents, patent applications, and technical standards described in this specification are incorporated herein by reference to the same extent as if each individual document, patent application, and technical standard were specifically and individually indicated to be incorporated by reference.

The invention claimed is:

1. An apparatus comprising:

a housing having a placement portion on which a discharge target object discharged from a discharge port is placed, and a standing wall rising from an end portion of the placement portion and having the discharge port formed therein, the housing allowing an operator to access the placement portion from at least a side facing toward a direction of the standing wall;

a display unit disposed within a height range of the standing wall and in a range aligned with the placement portion in a vertical direction; and a coupling portion that couples the standing wall and the display unit in a state in which a space is provided between the display unit and the placement portion, and enables the display unit to face a front direction of the housing and a side direction of the housing.

2. The apparatus according to claim 1, wherein the coupling portion enables the display unit to further face a back direction of the housing.

3. The apparatus according to claim 1, wherein the housing further includes another placement portion which is disposed on a back surface side with respect to the placement portion and on which a discharge target object is placed, and which has an overhang portion overhanging from the back surface side to a side opposite to a front direction of the housing.

4. The apparatus according to claim 3, wherein the other placement portion further includes a protruding portion protruding from the overhang portion to a side opposite to the placement portion with respect to the standing wall.

5. The apparatus according to claim 3, wherein:

the housing includes a projecting portion projecting toward a back surface side from a projecting starting point of the overhang portion on a side opposite to the placement portion with respect to the standing wall, and when viewed from the side direction of the housing, an end on a back surface side of the overhang portion overlaps with an end on a back surface side of the projecting portion.

6. The apparatus according to claim 3, wherein when viewed from the front direction of the housing, an end of the other placement portion in the side direction of the housing overlaps with an end of the placement portion in the side direction of the housing.

7. The apparatus according to claim 1, wherein a connecting portion between the standing wall and the coupling portion is located on a front side of the placement portion.

8. The apparatus according to claim 1, wherein the display unit is entirely located above the placement portion in a state of facing a back direction of the housing.

9. The apparatus according to claim 1, wherein:

a forming unit that forms an image on a recording medium is provided in a portion opposite to the placement portion with respect to the standing wall in the housing, and a medium, on which an image is formed by the apparatus, is discharged as the discharge target object onto the placement portion.

* * * * *